US011817009B2

(12) United States Patent
Munteanu

(10) Patent No.: US 11,817,009 B2
(45) Date of Patent: Nov. 14, 2023

(54) UNIVERSAL SIMULATOR FOR PRACTICING CARDIAC SURGERY TECHNIQUES AND PROCEDURES THROUGH A CLASSIC AND MINIMALLY INVASIVE APPROACH

(71) Applicant: Iulian Munteanu, Bucharest (RO)

(72) Inventor: Iulian Munteanu, Bucharest (RO)

( * ) Notice: Subject to any disclaimer, the term of this patent is extended or adjusted under 35 U.S.C. 154(b) by 228 days.

(21) Appl. No.: 17/282,880

(22) PCT Filed: Oct. 3, 2019

(86) PCT No.: PCT/RO2019/050001
§ 371 (c)(1),
(2) Date: Apr. 5, 2021

(87) PCT Pub. No.: WO2020/071934
PCT Pub. Date: Apr. 9, 2020

(65) Prior Publication Data
US 2021/0350724 A1    Nov. 11, 2021

(30) Foreign Application Priority Data
Oct. 5, 2018   (RO) ............................... a 2018 00777

(51) Int. Cl.
*G09B 23/30*    (2006.01)
(52) U.S. Cl.
CPC ......... *G09B 23/306* (2013.01); *G09B 23/303* (2013.01)
(58) Field of Classification Search
CPC ....... G09B 23/28; G09B 23/30; G09B 23/303
See application file for complete search history.

(56) References Cited

U.S. PATENT DOCUMENTS

| 6,234,804 B1 * | 5/2001 | Yong | ...................... G09B 23/34 434/274 |
| 6,790,043 B2 * | 9/2004 | Aboud | ................. G09B 23/303 434/262 |

(Continued)

FOREIGN PATENT DOCUMENTS

| CN | 2078033 | 5/1991 |
| CN | 1950862 | 4/2007 |

(Continued)

*Primary Examiner* — Kurt Fernstrom
(74) *Attorney, Agent, or Firm* — Scheef & Stone, LLP; Robin L. Barnes

(57) ABSTRACT

Universal simulator used to practice techniques and procedures in cardiac surgery through classical and minimally invasive approaches at the heart level, or other interventions in the thoracic surgery field. The simulator is composed of a synthetic thorax (1) which has several incisions (6) with mobile costo-vertebral joints (2) and mobile sterno-costal joints (3), a sternum with a medium cut (4) and a transversal cut (5) at the level of the third intercostal space, a porcine tissue composed of heart (7), two lungs (21), ascending aorta (17), descending aorta (22) and trachea (23) and a pumping system composed of an actuator (10), a piston cylinder (8) connected through tubing (11) to the left and right ventricles of the heart, a variable pressure pump (9) which pumps liquid through tubing (18) into the ascending aorta (17), an air trap (13) mounted between the pump (8) and the heart (7) and two unidirectional valves (19 and 20) for liquid and air, mounted in series in the superior part of the air trap (13) and a reservoir (14) for liquid connected to the pumps (8 and 9) which pump liquid into and from the heart (7) and to the ascending aorta (17).

7 Claims, 5 Drawing Sheets

(56) References Cited

U.S. PATENT DOCUMENTS

Figure 1:
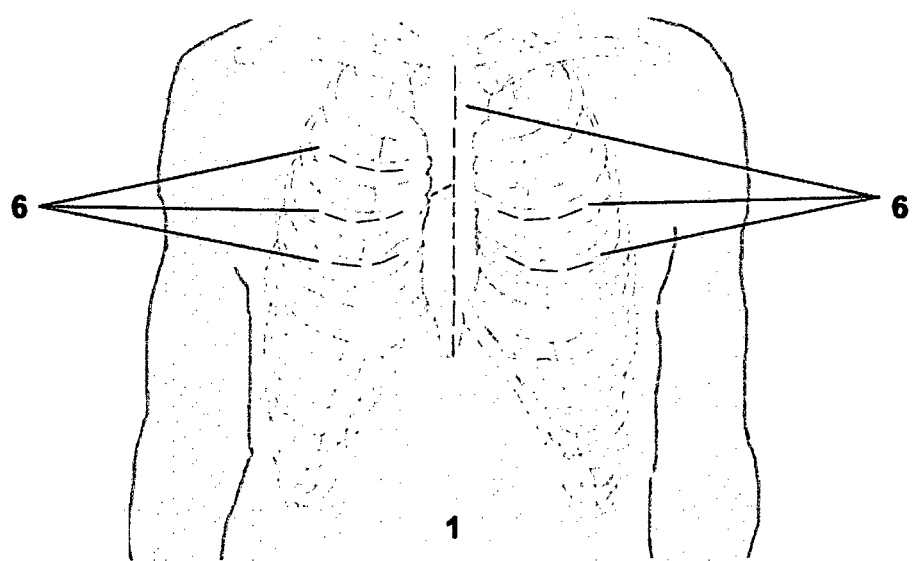

| | | | |
|---|---|---|---|
| 7,798,815 B2 | 9/2010 | Ramphal et al. | |
| 10,229,615 B2 * | 3/2019 | Carson | G09B 23/32 |
| 10,672,298 B2 * | 6/2020 | Newberry | F03B 13/14 |
| 10,885,813 B2 * | 1/2021 | Krummenacher | G09B 23/30 |
| 11,087,641 B1 * | 8/2021 | Khachatryan | G09B 23/303 |
| 11,176,849 B2 * | 11/2021 | Fatimi | G09B 23/303 |
| 11,238,755 B2 * | 2/2022 | Fiore | G09B 23/30 |
| 2004/0033477 A1 | 2/2004 | Ramphal et al. | |
| 2005/0214727 A1 | 9/2005 | Stoianovici et al. | |
| 2009/0226867 A1 * | 9/2009 | Kalafut | G09B 23/32 |
| | | | 434/272 |
| 2013/0309643 A1 * | 11/2013 | Segall | G09B 23/303 |
| | | | 434/268 |
| 2014/0370490 A1 | 12/2014 | Iaizzo et al. | |
| 2016/0027345 A1 | 1/2016 | Carson et al. | |
| 2017/0076636 A1 | 3/2017 | Moore et al. | |
| 2017/0116887 A1 * | 4/2017 | Mchale | G09B 23/306 |

FOREIGN PATENT DOCUMENTS

| | | |
|---|---|---|
| CN | 102509503 | 6/2012 |
| CN | 105451549 | 3/2016 |
| CN | 107424497 A | 12/2017 |
| CN | 107919047 | 4/2018 |
| WO | WO8203980 | 11/1982 |
| WO | WO00/51485 | 9/2000 |
| WO | WO2017/176857 | 10/2017 |
| WO | WO2018/087733 | 5/2018 |

* cited by examiner

UNIVERSAL SIMULATOR FOR PRACTICING CARDIAC SURGERY TECHNIQUES AND PROCEDURES THROUGH A CLASSIC AND MINIMALLY INVASIVE APPROACH

The invention refers to a universal simulator for practicing techniques and procedures in cardiac surgery through a classical and a minimally invasive approach.

Different types of cardiac surgery simulators are known, from the simplest ones to the most complex.

With the simple ones, only basic and unintegrated simulations can be done, with a low level of realism.

With virtual simulators, more complex surgical procedures can be simulated in a broader surgical context, but these simulators offer a very low level of realism and are inflexible and expensive.

Complex simulators based on a combination of biological tissue and different components offer a high level or realism and integration of the medical act while offering the possibility to simulate complex techniques and procedures.

The simulator described in U.S. Pat. No. 7,798,815 is based on porcine tissue, a rudimentary thoracic cavity and at least 2 intraventricular balloons, controlled by a computerized system, that are rhythmically inflated and deflated, making the heart move in a similar fashion to a live human heart. One disadvantage of this system is that only the surgical procedures done through the classical approach (median sternotomy) can be simulated, eliminating the possibility to simulate any of the minimally-invasive approaches (mini sternotomy, left or right mini thoracotomy), which represent newer approaches in the evolution of cardiac surgery.

Another disadvantage is the fact that there is no possibility to simulate surgical procedures at the mitral or tricuspid valves because of the intraventricular balloons used to create the cardiac movement, that pass through these valves. Also, for the simulations that would involve the cardiac wall and the visualization of the interior of the ventricles, the level of realism of the simulation is lower, due to the presence of the aforementioned balloons.

Another disadvantage of this simulator is that, because of the way the porcine tissue is prepared, it only allows the simulation of procedures at the cardiac level, without the possibility to simulate thoracic surgery procedures (pneumectomies, atypical resections). Also because of the way the porcine tissue is prepared, cardiac transplant cannot be simulated.

The scope of the invention is to increase the number of procedures that can be done on the same simulator, to increase the realism of the simulations and to decrease the time of preparation of porcine tissue, thus making simulations more accessible and easier to implement.

The object of the invention is to realize a cardiothoracic surgery simulator that allows the simulation of most cardiac surgery procedures, both through the classical and minimally invasive approach, offering at the same time an increased degree of realism.

The simulator, according to the invention, eliminates the disadvantages of known simulators, by being composed of a synthetic thorax 1 anatomically similar to the human thorax, composed from a skeleton covered by a layer of elastic material, which has a number of typical incisions 6 used in cardiac and thoracic surgery, with mobile joints at the costovertebral 2 and sternocostal 3 level, which allow the retraction of both the sternum and of the ribs, as it is done in reality during cardiac surgery, a sternum, cut longitudinally 4 and transversally 5 at the level of the third intercostal space or at the level of other intercostal spaces, one drainage orifice in the lowest part of each hemithorax (where the leaked liquid gathers), porcine tissue, specifically prepared for the simulator, composed of: a porcine heart 7, the two lungs 21, ascending aorta 17, descending aorta 22 and trachea 23, connected to a pumping system, composed of: an actuator 10, a piston cylinder 8 that acts as a pump, connected through tubing 11 to both ventricles of the heart, which pumps liquid in and out to and from the heart 7, creating the impression of a beating heart, a variable pressure pump 9 and a reservoir 14, which, through tubing 18, pumps liquid in the ascending aorta 17, maintaining a constant pressure at this level and creating the impression of blood flow, an air trap 13, mounted between the pump 8 and the heart 7 and two unidirectional valves, one for liquid 19 and one for air 20, mounted in series, on top of the air trap 13, and a reservoir for liquid 14 that is connected to the pumps 8,9 that pump liquid to and from the porcine heart 7 and the ascending aorta 17.

This invention offers the following benefits:
- It allows the simulation of cardiac surgery procedures at the heart and ascending aorta level through both classical and minimally invasive approaches.
- It allows the simulation of cardiac surgery procedures at the tricuspid and mitral level.
- It allows the simulation of some thoracic surgery procedures.
- It allows a faster preparation of the porcine tissue, which implies lower costs per simulation
- It allows the introduction of a surgical retractor and the retraction of the sternum and the ribs and their return to the initial position after the retractor is removed (just like in reality)

Figure 2:
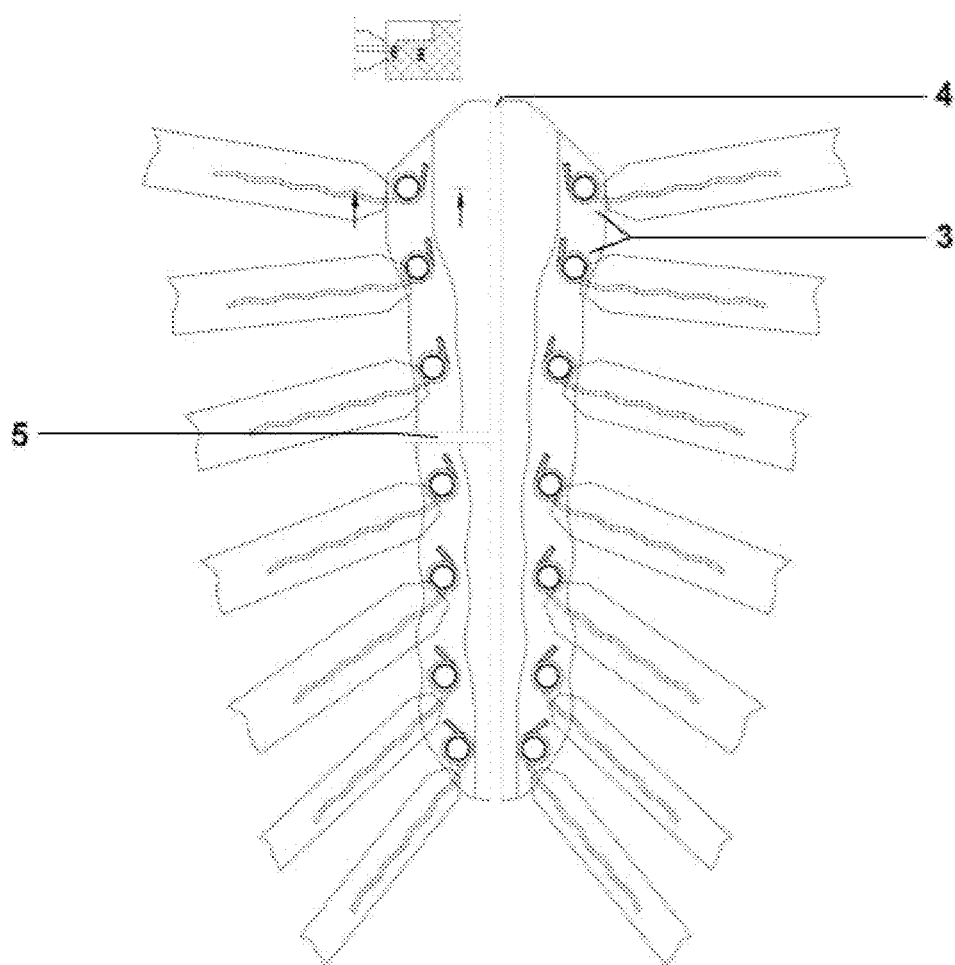

Below, one embodiment of the invention is presented in relation with FIGS. 1 to 5 which represent:

FIG. 1—Represents a synthetic thorax formed from a skeleton with mobile sternocostal joints and costovertebral joints, covered by a layer of latex FIG. 2—Represents the mobile sternocostal joints and the sternum with the median and transversal incisions.

Figure 3:
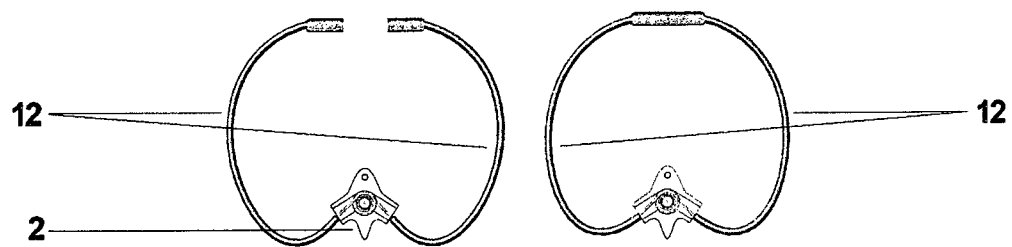

FIG. 3—Represents a costovertebral joint, the ribs and sternum (retracted and in the initial position)

Figure 4:
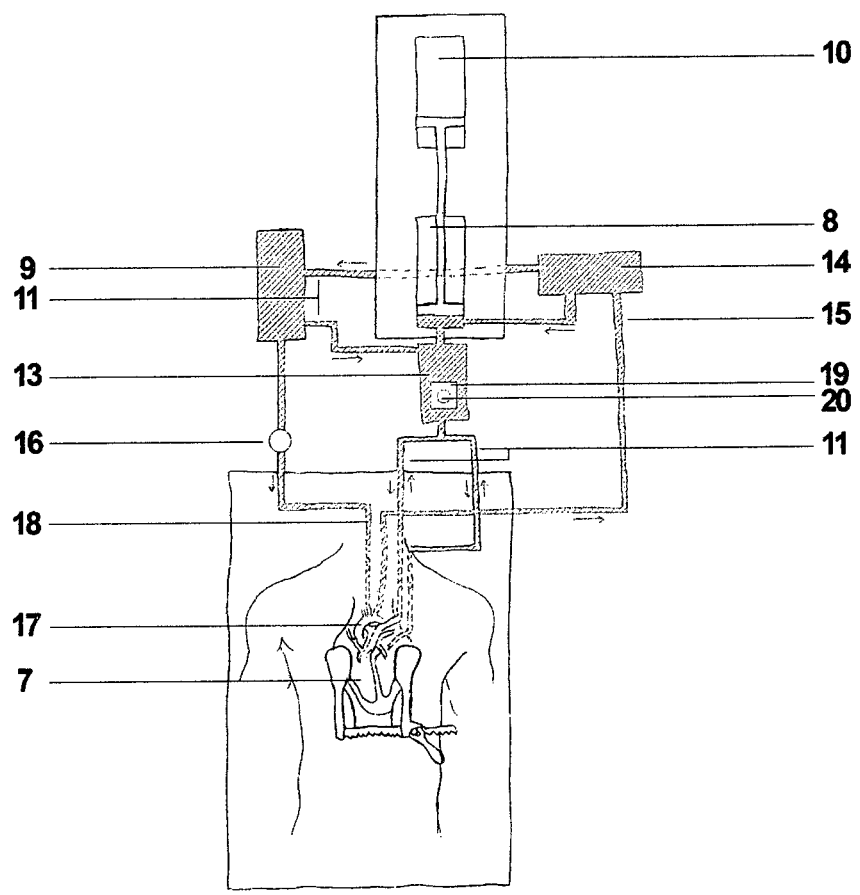

FIG. 4—represents the entire simulator formed from a synthetic thorax, porcine tissue and pumping system.

Figure 5:
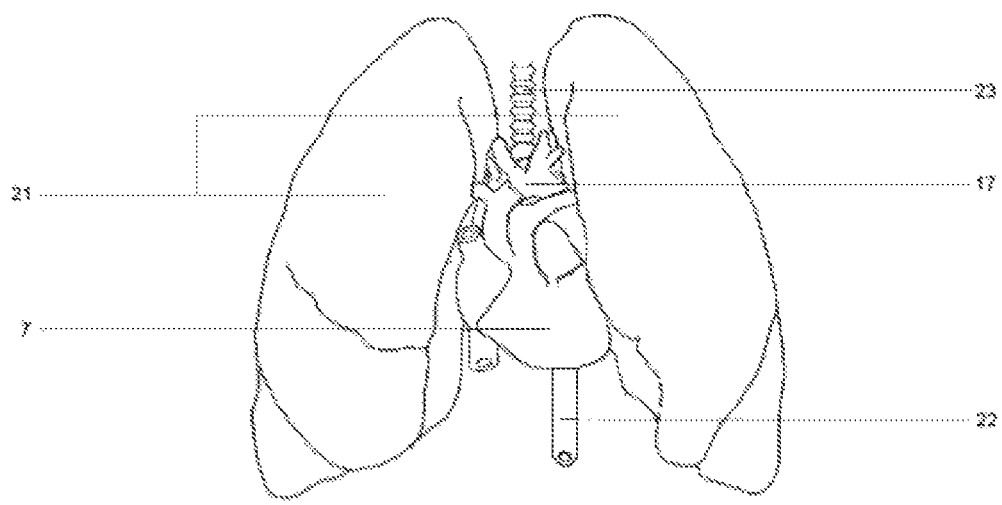

FIG. 5—represents the porcine tissue formed from the heart, lungs, ascending aorta, descending aorta and trachea.

EXAMPLE

The simulator, according to the invention, is composed of a synthetic thorax 1, anatomically similar to the human thorax, formed from a skeleton covered with a layer of elastic material (latex) which has several typical incisions 6 used in cardiac and thoracic surgery and with mobile costovertebral joints 2 and mobile sternocostal joints 3, which allow the retraction of both the sternum and the ribs as it is done in real cardiac surgery, a sternum, cut longitudinally 4 and transversally 5 at the level of the third intercostal space, one drainage orifice in the lowest part of each hemithorax (where the leaked liquid gathers), porcine tissue, specifically prepared for the simulator, composed of: a porcine heart 7, the two lungs 21, ascending aorta 17, descending aorta 22 and trachea 23, and a pumping system, composed of: an actuator 10, a piston cylinder 8 that acts as a pump, connected through tubing 11 to both ventricles of the heart, which pumps liquid in and out from the heart 7, creating the impression of a beating heart, a variable pressure pump 9, which, through tubing 18, pumps liquid in the ascending aorta 17, maintaining a constant pressure at this level and creating the impression of blood flow, an air trap 13, mounted between the pump 8 and the heart 7 and two unidirectional valves, one for liquid 19 and one for air 20, mounted in series on top of the air trap 13, and a reservoir for liquid 14 that is connected to the pumps 8,9 that pump liquid in the porcine heart 7 and the ascending aorta 17.

The simulator thus conceived is a universal simulator and allows the user to practice cardiac surgery techniques through both classical and minimally invasive approaches, without the need of using several simulators for various procedures.

The simulation of classical and minimally invasive approaches is obtained by means of the synthetic thorax 1, which has the following incisions: right anterolateral incisions at the second, third and fourth intercostal spaces, left anterolateral incisions at the third and fourth intercostal spaces. Other incisions can be done at any level of the thorax. Also, the sternum is cut longitudinally on its median line and transversally at the level of the third intercostal space. The sternum can be cut transversally at other levels, also. The joints (the correspondent of human joints) are mobile both at the costovertebral level 2 and sternocostal level 3. This mobility and the various incisions allow the introduction of a surgical retractor and the retraction of the ribs or of the sternum and their return to the initial position, once the retractor is removed.

The simulation of a beating heart, to be able to practice cannulation techniques and ON-PUMP coronary by-pass, is obtained by filling and emptying the heart 7 with liquid. This is obtained by means of a piston cylinder 8 which acts as a pump, connected through tubing 11 to the left ventricle (the tubing enters the heart through a pulmonary vein and reaches the mitral valve) and the right ventricle (the tubing enters the heart through the pulmonary artery, passes through the pulmonary valve and enters the right ventricle). Additional tubing can be connected to each of the two ventricles through other access points.

The cylinder can be actuated by different means (pneumatic, hydraulic, electric, etc.) by an actuator 10. The movement of the cylinder can by controlled by adjusting the length of the movement (which determines the pumped volume), the speed of the movement (which can be adjusted at the cycle level (number of cycles per time interval) or at the stage level (individual adjustment of the speed of the cylinder when filling up the heart and individual adjustment of the speed of the cylinder when emptying the heart). The adjustment of these parameters allows the simulation of a beating human heart in different conditions of heart rate or stroke volume.

The piston cylinder 8 is connected to a reservoir 14 from which it draws water for use.

Between the cylinder and the porcine heart 7 there is an air trap 13, which consists of a water reservoir, which has at its upper level a unidirectional water valve 19 (which doesn't allow water to pass) and above it, a unidirectional air valve 20 (which allows air to exit but not to enter). When air enter the system (either at the heart level during simulations, at the various tubing joints, or in any other parts) it is pushed with the water (by the cylinder) and reaches the air trap where it remains blocked. The air trap is also connected to the variable pressure pump 9 and can be periodically filled with liquid without stopping the system.

To allow the simulation of surgical procedures at the tricuspid and mitral level, the tubing 11 that enters the left and right ventricles is small in diameter and flexible and can be easily withdrawn from the surgical field when the pump is turned off.

To allow the simulation of cannulation during cardiac surgery, the ascending aorta 17 is pressurized at values similar to the physiological ones, by means of a variable pressure pump 9 (between 0 and 180 mmHg) which is connected to a reservoir 14 and the ascending aorta 17 through tubbing 18. By means of a different tube 15, the aorta is connected to the same reservoir 14 to which the pump is connected. The liquid that is pumped in the aorta 17 is expelled through the tube 15 connected to the reservoir 14. This way a water circuit is obtained which allows the maintenance of the desired pressure at the ascending aorta level. A pressure gauge 16 is connected to the circuit to show the pressure at the aortic 17 level.

To allow the simulation of certain procedures from thoracic surgery it is necessary to preserve the lungs 21 and the trachea 23 along with the heart. This allows the simulation of procedures on the lungs. Also, preserving the lungs and trachea decreases the time necessary to prepare the tissue for simulation, thus decreasing the costs per simulation.

The invention claimed is:

1. A simulator for practicing techniques in cardiac surgery through both classical and minimally invasive approach, comprised of a synthetic thorax, a porcine tissue and a pumping system, characterized in that:
   the synthetic thorax is formed from a skeleton covered in a layer of elastic material and comprising a sternum, cut longitudinally along its median line and transversally at a level of a third intercostal space or at other levels;
   the porcine tissue is especially prepared for the simulator consisting of: a heart having a left ventricle and a right ventricle, a pair of lungs, an ascending aorta, a descending aorta and a trachea, connected to the pumping system;
   the pumping system comprising an actuator, a piston cylinder which acts as a pump, connected through a first tubing to the left and right ventricles, which pushes liquid in and from the heart in a rhythmical manner creating an impression of a beating heart, a variable pressure pump which pumps liquid into the ascending aorta through a second tubing, maintaining a constant pressure at the aortic level and creating an impression of blood flow, an air trap mounted between the piston cylinder and the heart, with two unidirectional valves, one for liquid and one for air mounted in series at a superior side of the air trap and a reservoir for liquid connected to the piston cylinder and the variable pressure pump that move liquid to and from the heart and the ascending aorta.

2. The simulator according to claim 1, characterized in that the impression of the beating heart is done through the piston cylinder, which has an adjustable pumping speed and length and moves liquid in and from the heart, thus allowing the simulation of human heart beats in different filling and rate conditions, allowing simulation of surgical procedures, including procedures at a mitral valve and a tricuspid valve.

3. The simulator according to clam 1, characterized in that the skeleton further comprises mobile joints at a costovertebral level and mobile joints at a sternocostal level, which allow the simulation of both classical and minimally invasive approaches.

4. The simulator according to clam 1, characterized in that the layer of elastic material resembles human skin and subcutaneous tissue comprises several incisions that are used for a surgical approach, thus allowing the simulation of various cardiac surgery procedures.

5. The simulator according to claim 1, characterized in that the porcine tissue, along the heart consists of the pair of lungs, the ascending aorta, the descending aorta and the trachea, thus allowing simulation of thoracic surgery procedures.

6. The simulator according to claim 1, characterized in that a pressure at the ascending aorta level is constant, similar to a human physiological pressure, and adjustable between 0 and 180 mmHg.

7. The simulator according to claim 1, characterized in that the pressure at the ascending aorta is obtained by creating a circuit in which the liquid pumped through the second tubing by the variable pressure pump into the ascending aorta is returned via a third tubing to the reservoir from which the variable pressure pump feeds itself.

* * * * *